（12） United States Patent
Uejima et al.

(10) Patent No.: US 7,787,915 B2
(45) Date of Patent: Aug. 31, 2010

(54) FOLDING TYPE PORTABLE WIRELESS UNIT

(75) Inventors: Hiroyuki Uejima, Ishikawa (JP);
Yutaka Isoda, Kanagawa (JP);
Nobuharu Mashima, Toyama (JP);
Masayoshi Hirai, Kanagawa (JP);
Nobuhiro Iwai, Kanagawa (JP); Yutaka Saitoh, Ishikawa (JP); Kenichi Maeda, Tokyo (JP)

(73) Assignee: Panasonic Corporation, Osaka (JP)

( * ) Notice: Subject to any disclaimer, the term of this patent is extended or adjusted under 35 U.S.C. 154(b) by 634 days.

(21) Appl. No.: 11/571,747

(22) PCT Filed: Jul. 12, 2005

(86) PCT No.: PCT/JP2005/012848

§ 371 (c)(1),
(2), (4) Date: Jan. 8, 2007

(87) PCT Pub. No.: WO2006/006599

PCT Pub. Date: Jan. 19, 2006

(65) Prior Publication Data

US 2008/0300028 A1    Dec. 4, 2008

(30) Foreign Application Priority Data

Jul. 12, 2004   (JP) ............................. 2004-204343
Nov. 8, 2004    (JP) ............................. 2004-324136

(51) Int. Cl.
*H04M 1/00*   (2006.01)
(52) U.S. Cl. .................. 455/575.3; 455/575.7; 343/702

(58) Field of Classification Search .............. 455/575.3, 455/575.7
See application file for complete search history.

(56) References Cited

U.S. PATENT DOCUMENTS

2002/0075192 A1 *  6/2002  Iwai et al. .................... 343/702

(Continued)

FOREIGN PATENT DOCUMENTS

JP            10-84406           3/1998

(Continued)

OTHER PUBLICATIONS

International Search Report for PCT/JP2005/012848.

*Primary Examiner*—Nick Corsaro
*Assistant Examiner*—Gerald Johnson
(74) *Attorney, Agent, or Firm*—Seed IP Law Group PLLC

(57) ABSTRACT

In a folding mobile radio device, a gain is lowered considerably in its close state under such a condition that an upper case is excited directly in its open state to aim at a wide band and a high gain is used as an antenna. A folding mobile radio device includes a first case, a second case, a jointing portion for connecting the first case and the second case to open/close, a conductor element arranged in the first case, and a feeding element arranged in the second case. Then, in an open state via the jointing portion, the conductor element and the feeding element come close to each other and are coupled magnetically at a time of feeding a power whereas, in a close state via the jointing portion, the conductor element and the feeding element are apart from each other rather than the open state and are not coupled magnetically at a time of feeding a power.

11 Claims, 18 Drawing Sheets

U.S. PATENT DOCUMENTS

| | | |
|---|---|---|
| 2003/0117324 A1 | 6/2003 | Iwai et al. |
| 2004/0058721 A1* | 3/2004 | Kanazawa et al. ....... 455/575.3 |
| 2006/0125700 A1* | 6/2006 | Kanazawa .................. 343/702 |

FOREIGN PATENT DOCUMENTS

| | | | |
|---|---|---|---|
| JP | 10-084406 A | | 3/1998 |
| JP | 11-136015 | | 5/1999 |
| JP | 11-136015 A | | 5/1999 |
| JP | 3635195 B | * | 5/1999 |
| JP | 2001-156898 A | | 6/2001 |
| JP | 2002-335180 | | 11/2002 |
| JP | 2002-335180 A | | 11/2002 |
| JP | 3830773 B | * | 11/2002 |
| JP | 2003-8320 | | 1/2003 |
| JP | 2003-008320 A | | 1/2003 |
| JP | 2003-204281 | | 7/2003 |
| JP | 2003-204821 A | | 7/2003 |
| JP | 2004-23546 | | 1/2004 |
| JP | 2004-023546 A | | 1/2004 |
| JP | 2004-56426 | | 2/2004 |
| JP | 2004-056426 A | | 2/2004 |
| JP | 2004-72605 | | 3/2004 |
| JP | 2004-072605 A | | 3/2004 |
| JP | 2004-172919 | | 6/2004 |
| JP | 2004-172919 A | | 6/2004 |

* cited by examiner

FOLDING TYPE PORTABLE WIRELESS UNIT

TECHNICAL FIELD

The present invention relates to a small-sized folding mobile radio device having a high antenna performance.

BACKGROUND ART

Recently, the cellular phone as one type of the mobile radio device is spreading widely, and various types of the cellular phone have been developed. Among them, the folding compact type whose upper and lower cases are folded to enhance a portability when the cellular phone is not used is widely used. It is important that, since cellular phone is constructed to change its form according to the use situation, the antenna performance should be ensured in respective states. Also, a miniaturization and a multifunction is proceeding in the folding mobile radio device, and employment of the built-in antenna is proceeding as one of multifunctional tendencies to improve a design property.

Normally, as a means for achieving a good antenna performance in the folding cellular phone in both its open state and its close state, three examples will be illustrated as follows.

A first example is the folding cellular phone in which the projection-type antenna is mounted to the lower case on the hinge side. As this projection-type antenna, normally a helical antenna or a telescopic monopole antenna is employed. When the case is opened, the antenna acts as a resonance element that excites the ground pattern as a conductor pattern having a ground potential in the circuit board of the upper case. This antenna acts as a dipole antenna that employs the ground pattern on the circuit board of the upper case and the ground pattern on the circuit board of the lower case as radiation elements. The projection-type antenna possesses such an advantage that, since the antenna portion is projected from the case, an antenna gain can be enhanced in a state that the user holds the cellular phone by the hand. Also, when the case is closed, this antenna acts as a $\lambda/4$ monopole antenna because a wavelength is shortened by the radiation element such as the helical antenna, or the like.

However, according to the above structure, the projection portion of the antenna spoils an external appearance as the mobile radio device. Also, a whip antenna needs a housing space in the case and disturbs a reduction in size and thickness of the mobile radio device. Also, since the antenna portion is projected from the case, the mobile radio device possesses such an advantage that an antenna gain can be increased in a state where the user holds the cellular phone by the hand. In this event, since the current concentrates upon the antenna portion as the radiation element, this antenna is affected largely by the hand or the face in the speaking state, and the characteristics in the speaking state are varied largely.

As a second example, as the configuration in which the antenna is built to eliminate the projected portion, there are the L-type antenna, the inverted F-type antenna, and the like. These antennas operate in a mode where they are built perfectly in the case. When the L-type antenna is provided to the hinge side of the lower case, this antenna acts as the resonator element that excites the upper case similarly to the case where the helical antenna is employed. In this case, since there is a limit to a length as the built-in monopole antenna, an electric coupling with the upper case is weak when the case is opened, and thus the characteristics when the case is opened are deteriorated. Also, when the inverted F-type antenna is provided to the upper case, a height from the substrate in the upper case must be kept to ensure the characteristics and also an area of the plate-like antenna must be widened, which causes an obstruction to a reduction in size and thickness of the mobile radio device.

As a third example, there is the method of constructing the antenna configuration having no projection by applying the principle under which that the conductor in the upper case is used as the radiation element when the case is opened, and then exciting directly the conductor in the upper case when the case is opened to employ such conductor as the radiation element. For example, as disclosed in Patent Literature 1, there is the folding radio device having such a structure that the conductor is connected to the shield box in the upper case via the flexible cable and then the upper shield box is employed as the antenna. According to this method, since the radiation case has no limit to a height and an effective area of the antenna can be set wide, the antenna performance having a high gain over a wide band can be achieved.

However, this antenna configuration acts as an ideal $\lambda/2$ dipole antenna when the case is opened, nevertheless the current flows are cancelled mutually when the case is closed and this antenna configuration cannot act as the antenna in theory. In the model in which an upper case 101 and a lower case 102 are joined by a hinge 103, current flows 105 serve as a dipole antenna when the case is opened, as shown in FIG. 1(*a*), but a radiation resistance is reduced because of cancellation of the current flows 105 when the case is closed, as shown in FIG. 1(*b*). FIG. 2 shows a change of such antenna performance. In this comparison experiment, a use frequency is set to 900 MHz, and a frequency (MHz) is set on an abscissa and a VSWR (Voltage Standing Wave Ratio) is set on an ordinate. In this FIG. 2, a graph showing a change of the antenna characteristic (VSWR) of the antenna structure when the case is closed is indicated by $\alpha$, and a graph showing a change of the antenna characteristic (VSWR) of the antenna structure when the case is closed is indicated by $\beta$. As understood from the experimental result shown in FIG. 2, a frequency bandwidth that can satisfy VSWR<3 (a voltage of a reflected wave is less than 50%) as one of necessary matters to get a good antenna characteristic is extended over a 350 MHz or more when the case is opened, but no frequency bandwidth that can satisfy VSWR<3 is present when the case is closed, so that a large change of the characteristic can be confirmed. As a result, another antenna that can operate when the case is closed is needed and thus its circuit configuration becomes complicated.

The above problems are not restricted to the folding cellular phone and will arise in the normal folding mobile radio device.

Patent Literature 1: JP-A-2002-335180

DISCLOSURE OF THE INVENTION

Problems that the Invention is to Solve

As described above, in the small-sized folding mobile radio device, under such a condition that the conductor in the upper case is excited directly in its open state to aim at a wide band and a high gain and is used as an antenna, it is possible that the gain is lowered considerably in its close state.

It is an object of the present invention to provide a folding mobile radio device that is able to show a high antenna performance by a single antenna in open and close states not to take up a large space and is suitable for miniaturization.

Means for Solving the Problems

A folding mobile radio device of the present invention includes a first case; a second case; a jointing portion for connecting the first case and the second case to open/close; a conductor element arranged in the first case; and a feeding element arranged in the second case. Then, (A) in an open state via the jointing portion, the conductor element and the feeding element come close to each other and are coupled magnetically at a time of feeding a power, and (B) in a close state via the jointing portion, the conductor element and the feeding element are apart from each other rather than a state (A) and are not coupled magnetically at a time of feeding a power. Here, the wording "magnetic coupling at a time of feeding a power" can contain at least both of the magnetic coupling between two conductors located closely mutually and the magnetic coupling made by a direct contact (series connection) between two conductors.

Preferably the feeding element has an electrical length of almost ¼ wavelength.

Preferably the conductor element is connected to a conductor plate arranged in the first case.

Preferably the conductor element is connected to a conductor cover fitted to the first case, and the conductor cover is connected to the conductor plate arranged in the first case via at least one contact.

Preferably the conductor element and the feeding element have a flat plane portion respectively, and respective flat plane portions oppose closely to each other in the state (A).

Preferably the conductor element is arranged on an end portion of the first case adjacent to the jointing portion, and the feeding element is arranged on an end portion of the second case adjacent to the jointing portion, and the conductor element and the feeding element are arranged adjacent to the jointing portion to oppose to each other in the state (A), and the conductor element and the feeding element are arranged across the jointing portion in the state (B).

Preferably main portions of the conductor element and the feeding element are in parallel with a rotation shaft of the jointing portion.

Preferably the conductor element has an electrical length of almost ¼ wavelength.

Preferably one end of the conductor element is connected to the conductor plate arranged in the first case or the conductor cover fitted to the first case, and other end is an open end.

Preferably a connection position of one end of the conductor element and the conductor plate arranged in the first case or the conductor cover fitted to the first case is located near the feeding portion of the feeding element.

Also the folding mobile radio device of the present invention further includes a wiring bundle composed of a plurality of conductor wires that connect electrically circuit parts arranged in the first case and circuit parts arranged in the second case; wherein the wiring bundle is arranged at a predetermined interval from the power feeding portion of the feeding element.

Preferably the conductor element contacts the feeding element in the state (A).

Preferably the conductor element is exposed from a through hole formed in the first case and the feeding element has a contact portion formed like a pin and protruded from the second case, and the conductor element directly contacts the contact portion in the state (A).

Preferably at least one of the conductor element and the feeding element is constructed by a plurality of elements having a different electrical length respectively.

Also, the folding mobile radio device of the present invention further includes a first switching portion for switching a connection such that either one end of the conductor element is connected to the conductor plate arranged in the first case or the conductor cover fitted to the first case or is opened; and a second switching portion for switching a connection such that either other end of the conductor element is connected to the conductor plate arranged in the first case or the conductor cover fitted to the first case or is opened.

The folding mobile radio device of the present invention can be utilized as a folding cellular phone in which the first case is an upper case and the second case is a lower case.

ADVANTAGE OF THE INVENTION

According to the present invention, the folding mobile radio device that is able to show the high antenna performance by a single antenna in open and close states not to take up a large space and is suitable for miniaturization can be provided.

BRIEF DESCRIPTION OF THE DRAWINGS

FIG. 1 An explanatory view of an operation of an antenna structure to excite directly an upper case, wherein FIG. 1(a) shows a folding cellular phone in its open state, and FIG. 1(b) shows the folding cellular phone in its close state.

FIG. 3 An explanatory view showing a folding cellular phone according to a first embodiment of the present invention, wherein FIG. 3(a) is a front view, and FIG. 3(b) is a side view.

FIG. 4 An explanatory view showing the folding cellular phone according to the first embodiment, wherein FIG. 4(a) is a side view in its open state, and FIG. 4(b) is a side view in its close state.

FIG. 5 An explanatory view showing the folding cellular phone according to the first embodiment, wherein FIG. 5(a) is a side view in its open state, and FIG. 5(b) is a side view in its close state.

FIG. 7 An explanatory view showing a folding cellular phone according to a second embodiment of the present invention, wherein FIG. 7(a) is a front view in its open state, FIG. 3(b) is a side view in its open state, and FIG. 3(c) is a side view in its close state.

FIG. 8 An explanatory view showing a folding cellular phone according to a third embodiment of the present invention, wherein FIG. 8(a) is a back view in its open state, and FIG. 8(b) is a side view in its open state.

FIG. 10 An explanatory view of an antenna operation of the folding cellular phone according to the third embodiment, wherein FIG. 10(a) is an explanatory view of an antenna operation when a connection point between a conductor element and a ground pattern of an upper substrate is positioned near a feeding portion of a feeding element, and FIG. 10(b) is an explanatory view of an antenna operation when an open end of the conductor element is positioned near the feeding portion of the feeding element.

Figure 1:
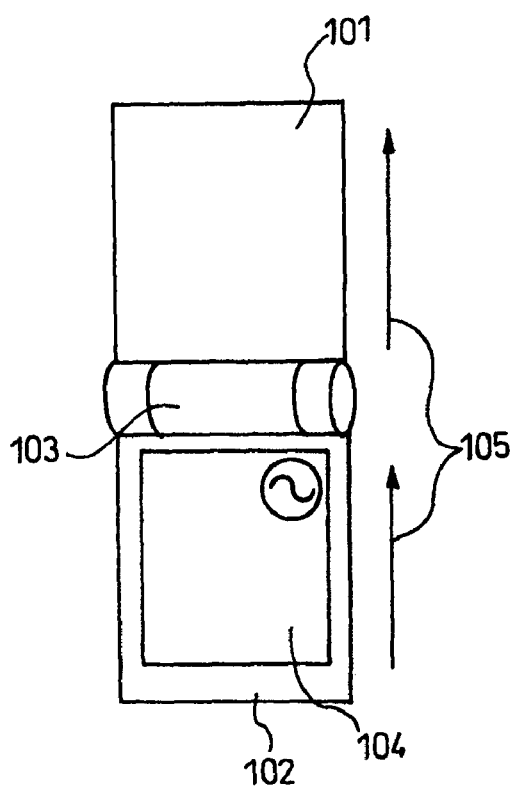
Figure 1:
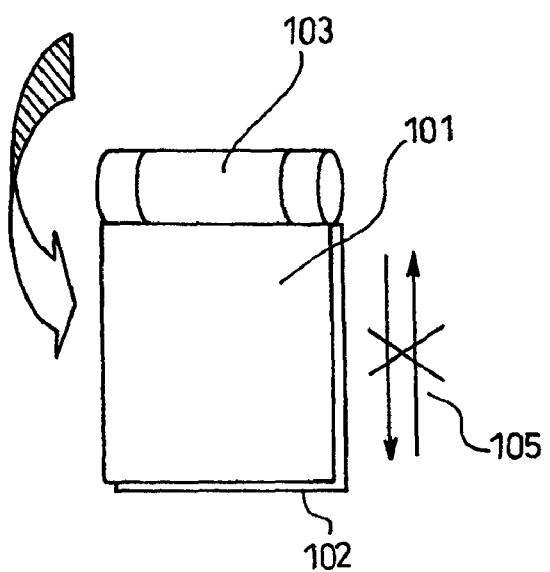
Figure 2:
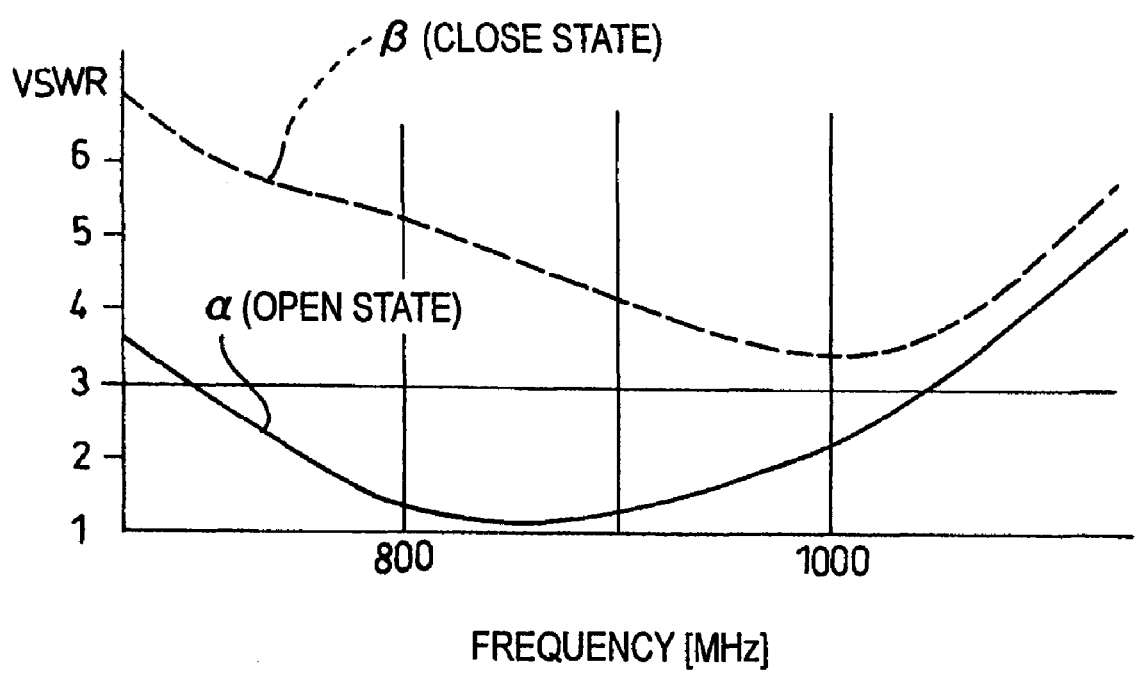
FIG. 2 An explanatory view of an antenna performance in the prior art.

DESCRIPTION OF REFERENCE NUMERALS AND SIGNS 101 uppercase
102 lower case
103 hinge portion
104 lower substrate
105 current flow
301 uppercase
302 lower case
303 hinge portion
304 upper substrate
305 lower substrate
306 LCD
307 feeding metal plate
308 plate-like conductor element
309 matching circuit
310 radio circuit
401 high frequency coupling flow
501 backside case of an upper case
502 contact portion to a circuit board
503 contact portion to a circuit board
701 ground pin
702 DC current flow
703 contact portion
704 through hole
800(*a*), 800(*b*) folding cellular phone
801, 806, 807 conductor element
802, 808 feeding element
803 receiver portion (speaker)
804 transmitter portion (microphone)
805 conductor plate
809 flexible cable
810, 811 coupling connector
812, 813 high frequency switch
901, 902, 903, 904, 905, 906, 907, 908 antenna current
1000 human body
1001 left hand
1002 right hand
1003 head portion

BEST MODE FOR CARRYING OUT THE INVENTION

Embodiments of the present invention will be explained in detail with reference to the accompanying drawings hereinafter.

First Embodiment

Figure 3:
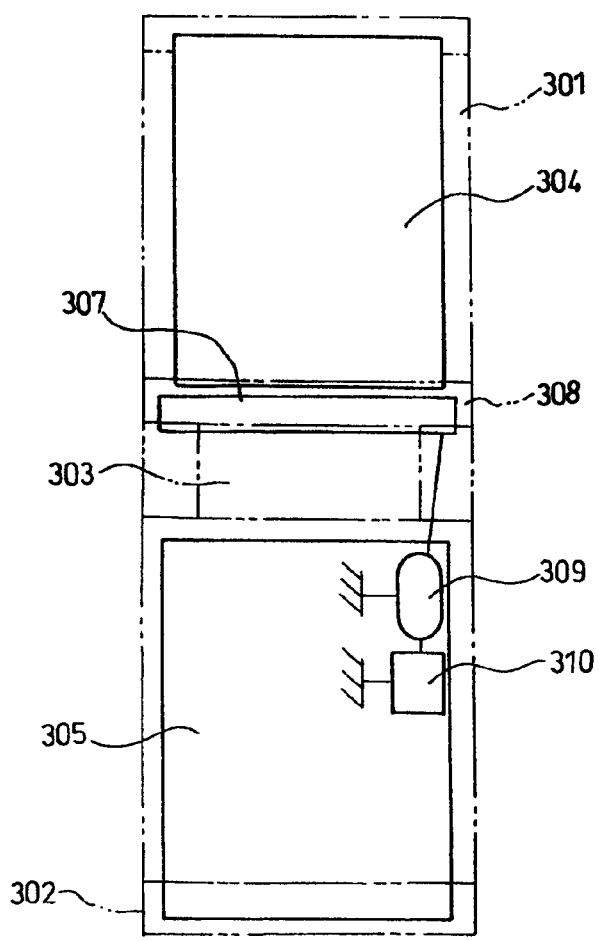
Figure 3:
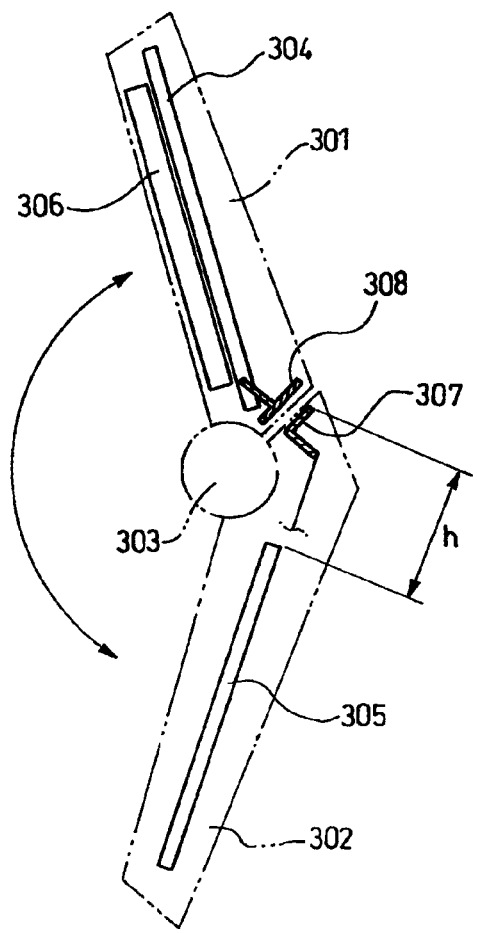

FIG. 3 shows a folding mobile radio device according to a first embodiment of the present invention, and shows an example where the present invention is applied to a folding cellular phone. In this folding cellular phone, an upper case 301 constituting a first case and a lower case 302 constituting a second case are joined by a hinge portion 303 constituting a joint portion. The folding cellular phone takes two states of an open state and a close state because the upper and lower cases are turned on the hinge portion 303.

A liquid crystal display portion (LCD) 306, a receiver portion (speaker) (not shown), and the like are provided to the upper case 301. Also, an upper substrate (first substrate) 304, and the like are arranged in the inside, and a plate-like conductor element 308 that is connected to the upper substrate 304 and constitutes a conductor element is arranged on the back side. The plate-like conductor element 308 is arranged on one end portion of the upper case 301 near the hinge portion 303.

In contrast, an operation portion and a transmitter portion (microphone) (not shown) are provided to the lower case 302, and also a lower substrate (second substrate) 305 is arranged in the inside. Various circuits containing a control circuit (not shown), e.g., a matching circuit 309, a radio circuit 310, etc. described later are mounted on this lower substrate 305.

Also, a feeding metal plate 307 constituting a feeding element is provided to one end portion of the lower case 302 near the hinge portion 303. When the case is opened, flat planes of the feeding metal plate 307 and the plate-like conductor element 308 face closely each other. When the case is closed, the plate-like conductor element 308 is positioned on the upper side of the hinge portion 303 when viewed from the lower case 302, and is parted from the feeding metal plate 307. One end portion of the feeding metal plate 307 is connected to the radio circuit 310 via the matching circuit 309.

Figure 4:
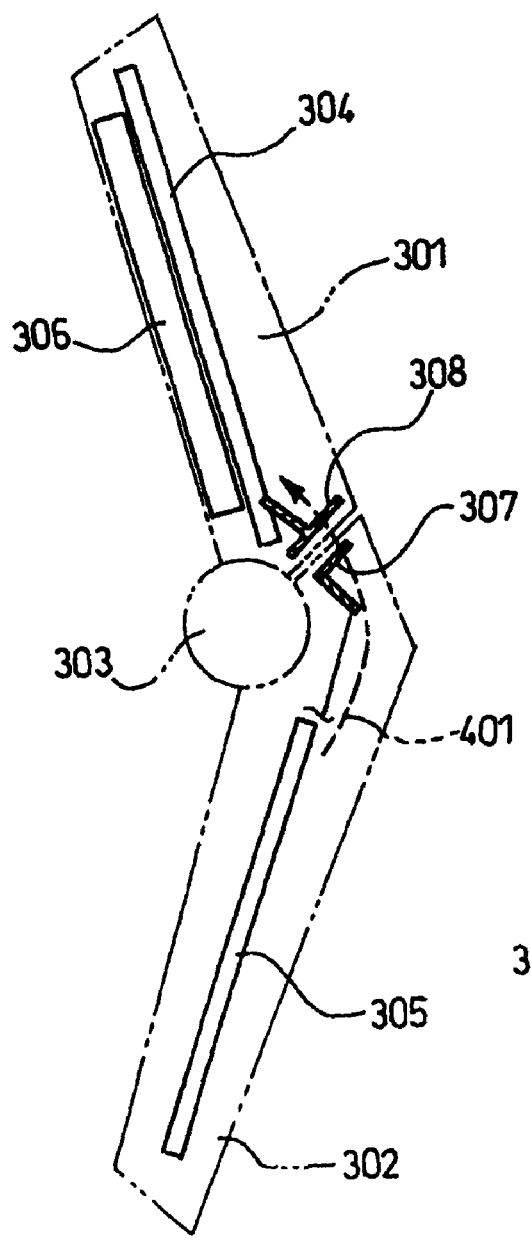
Figure 4:
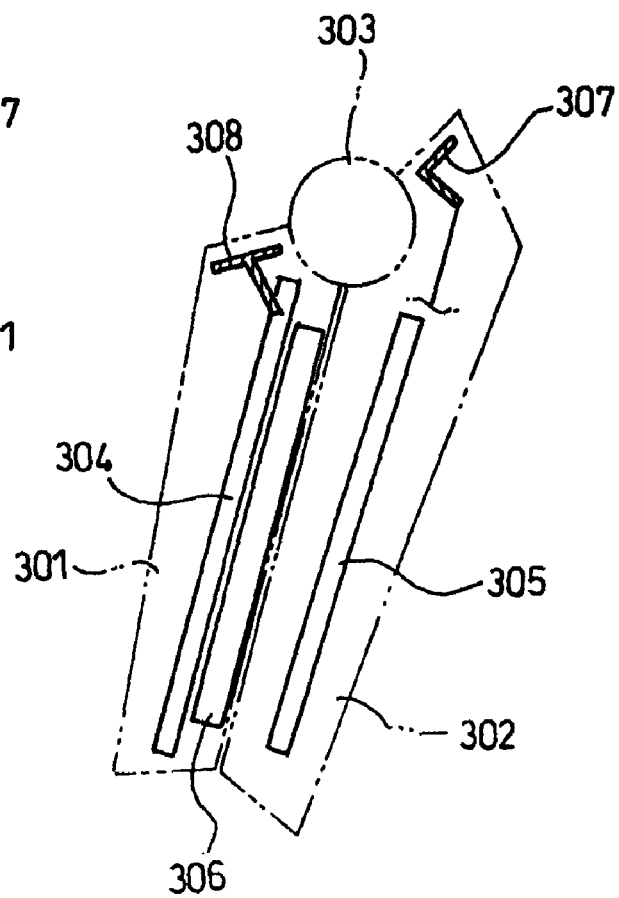

As shown in FIG. 4(*a*), when the case is opened, the feeding metal plate 307 is structurally positioned in vicinity of the upper case 301 because such plate exists on an upper portion of the lower case. Then, the plate-like conductor element 308 and the feeding metal plate 307 oppose closely to each other in positions adjacent to the hinge portion 303 such that they can be coupled by the capacitive coupling at the time of power feeding. Also, the plate-like conductor element 308 that is shaped into a plane and connected to an upper substrate ground comes close to the feeding metal plate 307 on a plane-to-plane basis. That is, respective flat planes of the plate-like conductor element 308 and the feeding metal plate 307 oppose closely to each other. The opposed flat planes have a capacitance and can be replaced with a capacitor. This capacitor has a low impedance in a high frequency range to become a conduction state 401. Accordingly, a conductor in the upper case acts as an upper antenna element whereas a ground pattern on the lower substrate 305 acts as a lower antenna element, and the matching circuit 309 fulfills a function of matching an impedance of the upper antenna element with an input impedance of the radio circuit 310. In other words, since a ground pattern of the upper case 301 and a ground pattern on the lower substrate 305 act as a dipole antenna, characteristics equivalent to the antenna structure that excites directly the upper case can be achieved.

In contrast, as shown in FIG. 4(b), when the case is closed, the plate-like conductor element 308 is parted from the feeding metal plate 307 and thus the capacitive coupling in a high frequency range disappears. That is, when the case is closed, the plate-like conductor element 308 and the feeding metal plate 307 become more distant from the open state of the case and are not electrically coupled at a time when a power is fed. In this example, the plate-like conductor element 308 and the feeding metal plate 307 are arranged across the hinge portion 303. As a result, the mutual cancellation of current flows 105, as shown in FIG. 1(b), is never caused. Thus, the feeding metal plate 307 operates as a λ/4 monopole antenna and a good antenna performance can be ensured.

Figure 6:
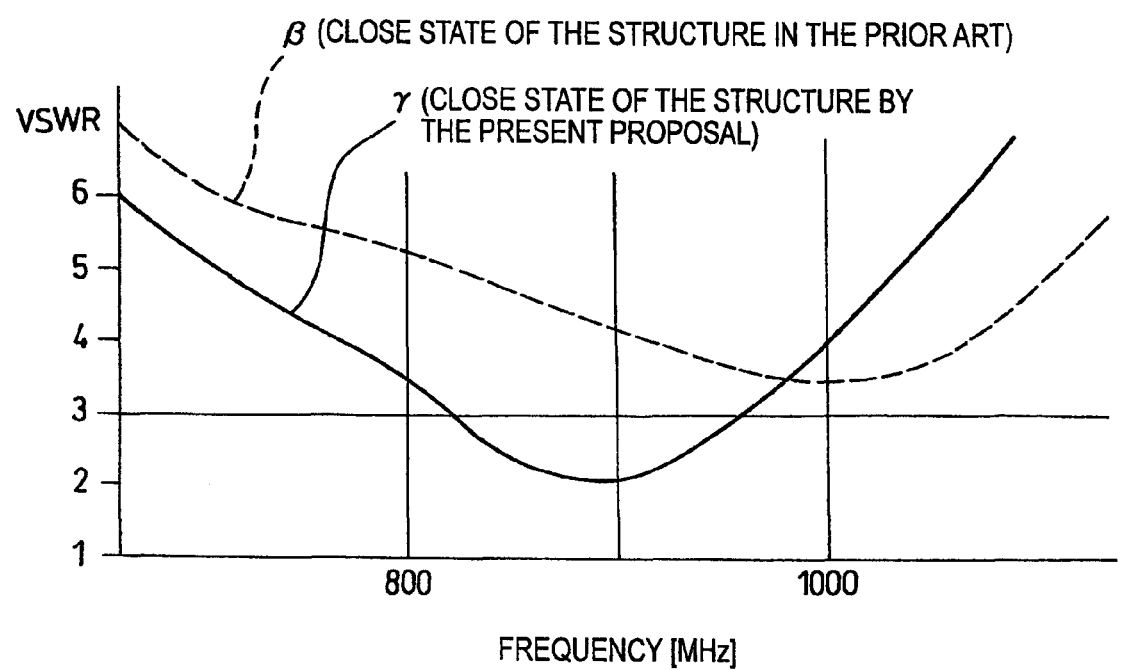
FIG. 6 An explanatory view of an antenna performance according to this proposal in a close state.

Also, when the case is closed, the feeding metal plate 307 acts as an L-shaped antenna having an L shape by adjusting its height (h in FIG. 3) from the lower substrate 305. At that time, even though an element length is short, an effective area can be increased by bending the feeding metal plate 307 as a plate and thus a resonance frequency can be lowered owing to the wavelength reducing effect of the surrounding resin material, etc. A comparison of antenna performances between the present structure and the prior art structure when the case is closed is shown in FIG. 6. In this comparison experiment, a use frequency is set to 900 MHz, and a frequency (MHz) is set on an abscissa and a VSWR (Voltage Standing Wave Ratio) is set on an ordinate. In this FIG. 6, a graph showing a change of the antenna characteristic (VSWR) of the structure in the prior art when the case is closed is indicated by β, and a graph showing a change of the antenna characteristic (VSWR) of the structure by the present proposal when the case is closed is indicated by γ. As understood from the experimental result shown in FIG. 6, no frequency bandwidth within which VSWR<3 is satisfied could be obtained by the structure in the prior art in its close state, but VSWR<3 could be satisfied over a bandwidth of 140 MHz by the antenna structure according to the present proposal in its close state.

Figure 5:
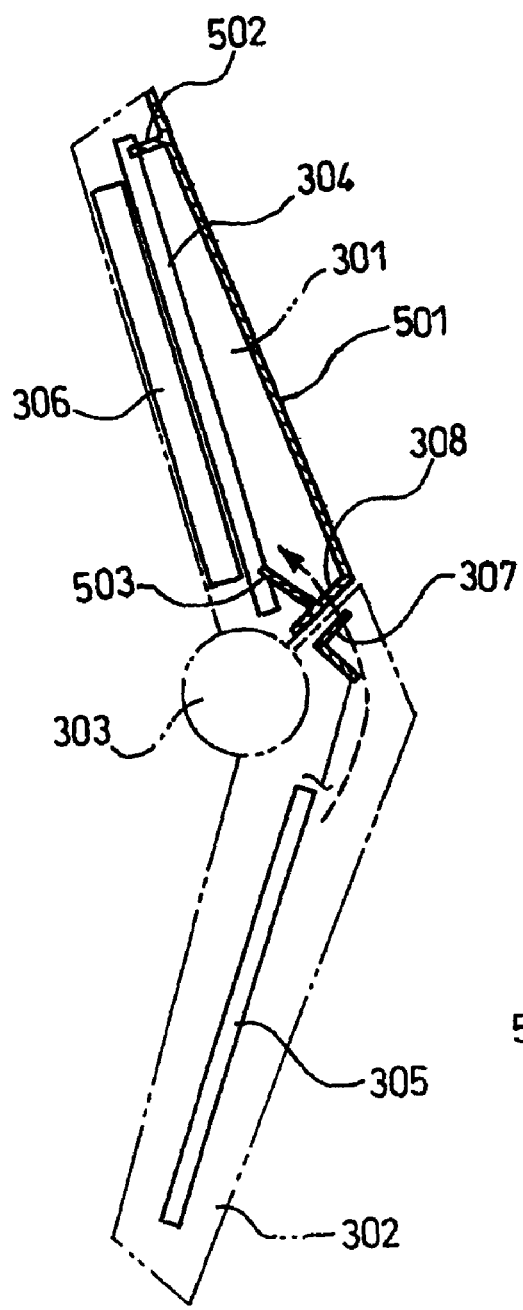
Figure 5:
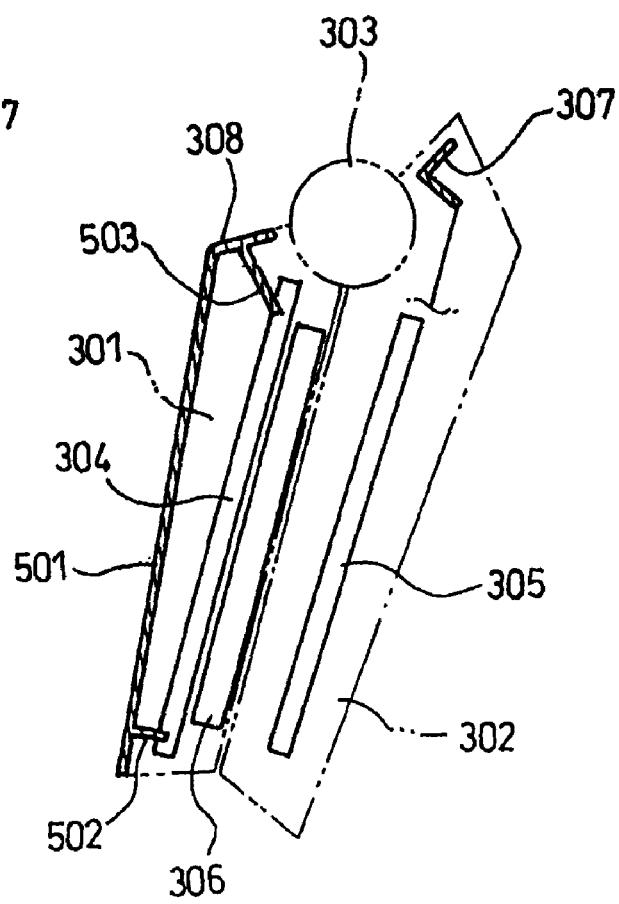

Also, since the plate-like conductor element 308 of the upper case 301 and the feeding metal plate 307 of the lower case 302 are coupled in terms of the capacitive coupling when the case is opened, a size of the plate-like conductor element 308 can be increased. FIG. 5 shows a concrete example according to such variation. A backside case 501 (conductive cover) of the upper case 301 is formed of a metal, and is used as the plate-like conductor element 308. In this case, because the backside case 501 must has the same current flow as the upper substrate ground, it is desirable from the antenna performance that the upper substrate 304 and the backside case 501 should look like the integral case in a high frequency range by providing many contact portions 502, 503 to the ground of the upper substrate 304. Here, a metal may be plated on the backside case 501 to ensure an electric conduction to the plate-like conductor element 308 and the upper substrate 304. Also, in this example, the conductive cover is constructed by the backside case. But an arrangement position of the conductive cover is not particularly limited.

According to the above structure, the good antenna characteristics can be obtained in both the open state and the close state. Also, these coupling portions act as an antenna feeding point and a current distribution is increased. Therefore, the influence of the hand in speaking can be reduced by arranging the feeding position in the inside in the open state to set the feeding portion apart from the hand.

Also, when the case is closed, the antenna can be resonated at various frequencies owing to the wavelength reducing effect of the resin that surrounds the feeding metal plate being bent like a plate. Therefore, this structure can be used as the antenna in its close state by selecting appropriately the shape and the height of the feeding metal plate, and the dielectric constant of the resin according to the use frequency.

As explained above, in the folding mobile radio device of the present embodiment, the antenna can be provided in a built-in mode unlike the projection-type antenna structure in the prior art, and the antenna performance that is higher than the built-in L-shaped antenna or the inverted F-type antenna can be assured. Also, since a single antenna can function in both the open state and the close state, a circuit structure can be made simple and also a miniaturization of the case and a reduction in a production cost can be achieved.

Second Embodiment

Figure 7:
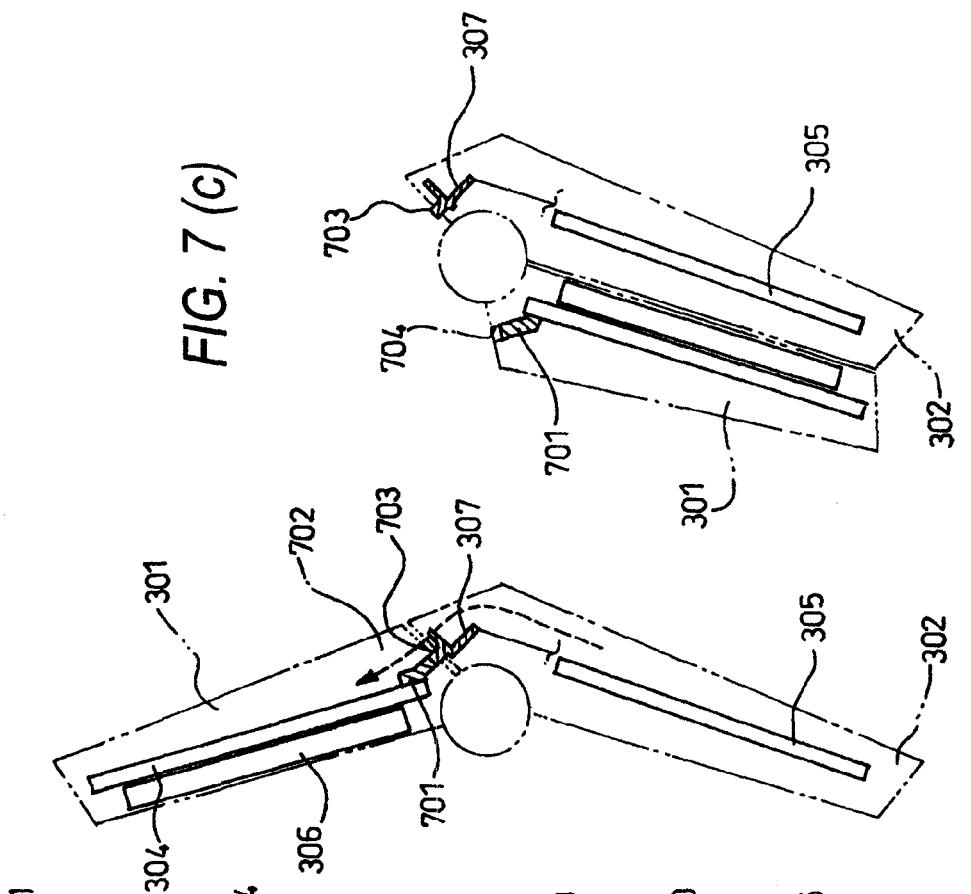

FIG. 7 is a view showing a folding cellular phone according to a second embodiment of the present invention. In FIG. 7, the same reference symbols as those in FIG. 3 indicate the same constituent elements, and their detailed explanation will be omitted herein.

The folding cellular phone of the present embodiment shown in FIG. 7 is similar to the structure in FIG. 3 in that the upper case 301 and the lower case 302 are joined by the hinge portion 303 and also the feeding metal plate 307 is arranged on one end portion of the lower case 302 near the hinge portion 303. Also, the feeding metal plate 307 has a pin-shaped contact portion 703 and this contact portion 703 is projected from the lower case 302 to constitute an exposed structure. Also, a ground pin 701 connected to the upper substrate 304 is provided on the back side of the upper case 301, and is exposed from the lower case 302 through a through hole 704 formed in the upper case 301. According to this structure, the contact portion 703 of the feeding metal plate 307, which is positioned structurally in vicinity of the upper case 301 when the case is opened, is connected in series with the ground pin 701 that is connected to the substrate ground in the upper case existing on the lower portion of the upper case 301. In other words, at least a part of the plate-like conductor element 308 and the feeding metal plate 307 may be exposed from the upper case 301 and the lower case 302 respectively.

Accordingly, like the first embodiment, a ground pattern of the upper case 301 acts as the upper antenna element whereas the ground pattern on the lower substrate 305 acts as the lower antenna element, and the matching circuit 309 fulfills a function of matching an impedance of the upper antenna element with an input impedance of the radio circuit 310. In other words, the ground pattern of the upper case 301 and the ground pattern on the lower substrate 305 act as a dipole antenna.

Also, since the contact portion 703 and the ground pin 701 are connected in series, the feeding structure can be constructed small in size. At that time, it is desired that a contact resistance value should be reduced to 1Ω or less, for example, from the respect of the antenna characteristic. Also, since the ground of the upper substrate 304 and the ground of the lower substrate 305 are coupled directly in series in this structure, an action of the ground can be strengthened by the series-coupling of the upper substrate and the lower substrate. As a result, this folding cellular phone is resistant to faults such as screen freeze, power disconnection, or the like due to a static electricity caused by the human body of the user, which leads to quality improvement of the products.

Third Embodiment

Figure 8:
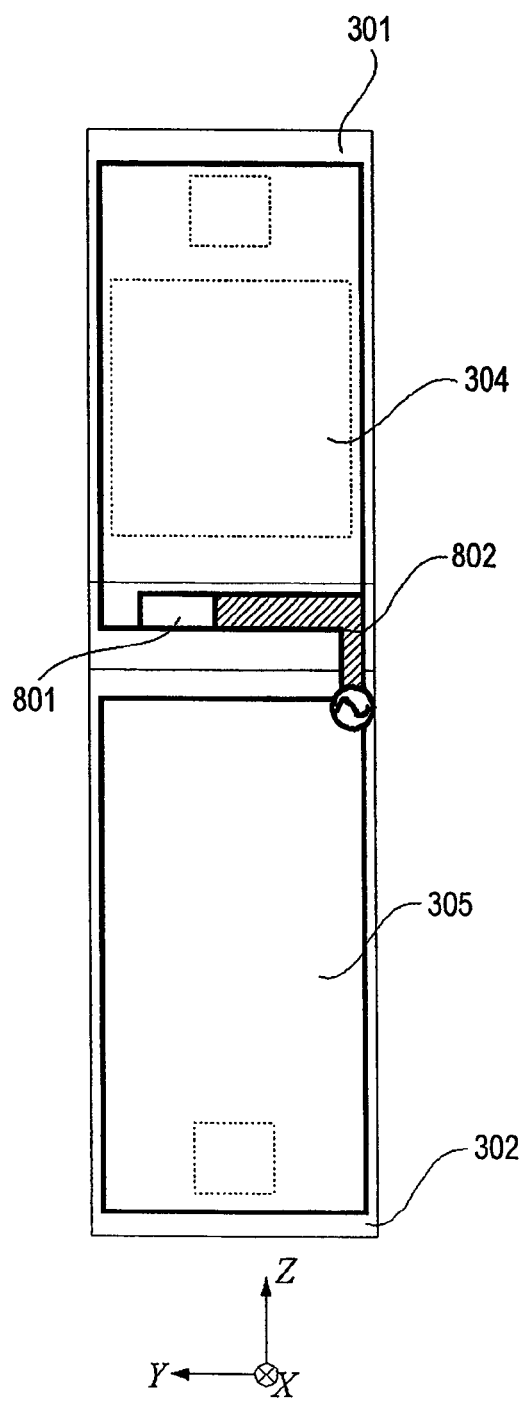
Figure 8:
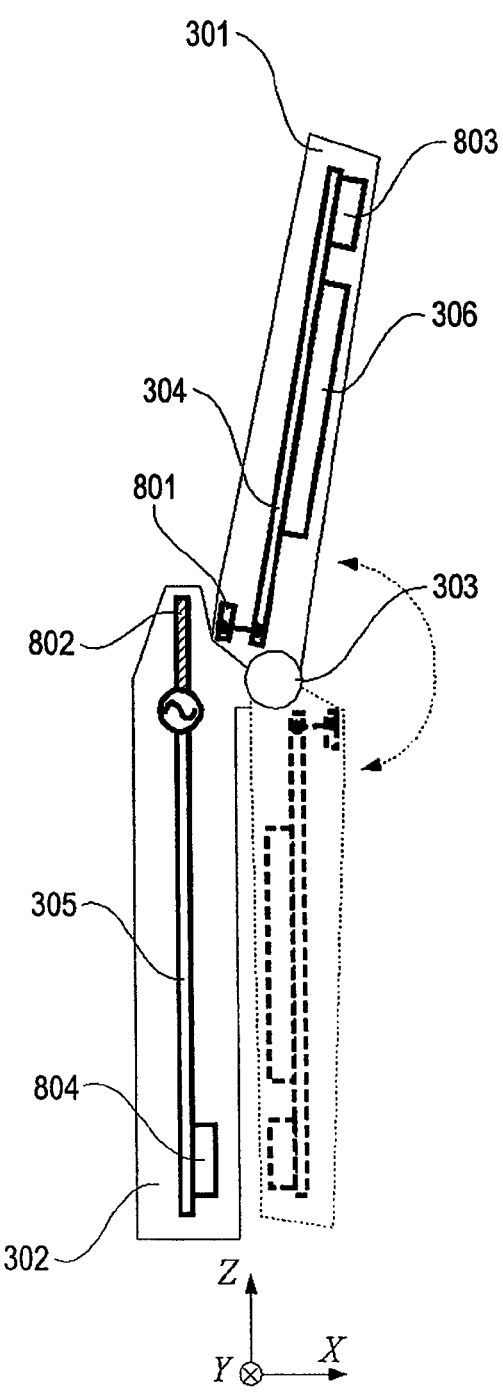
Figure 9:
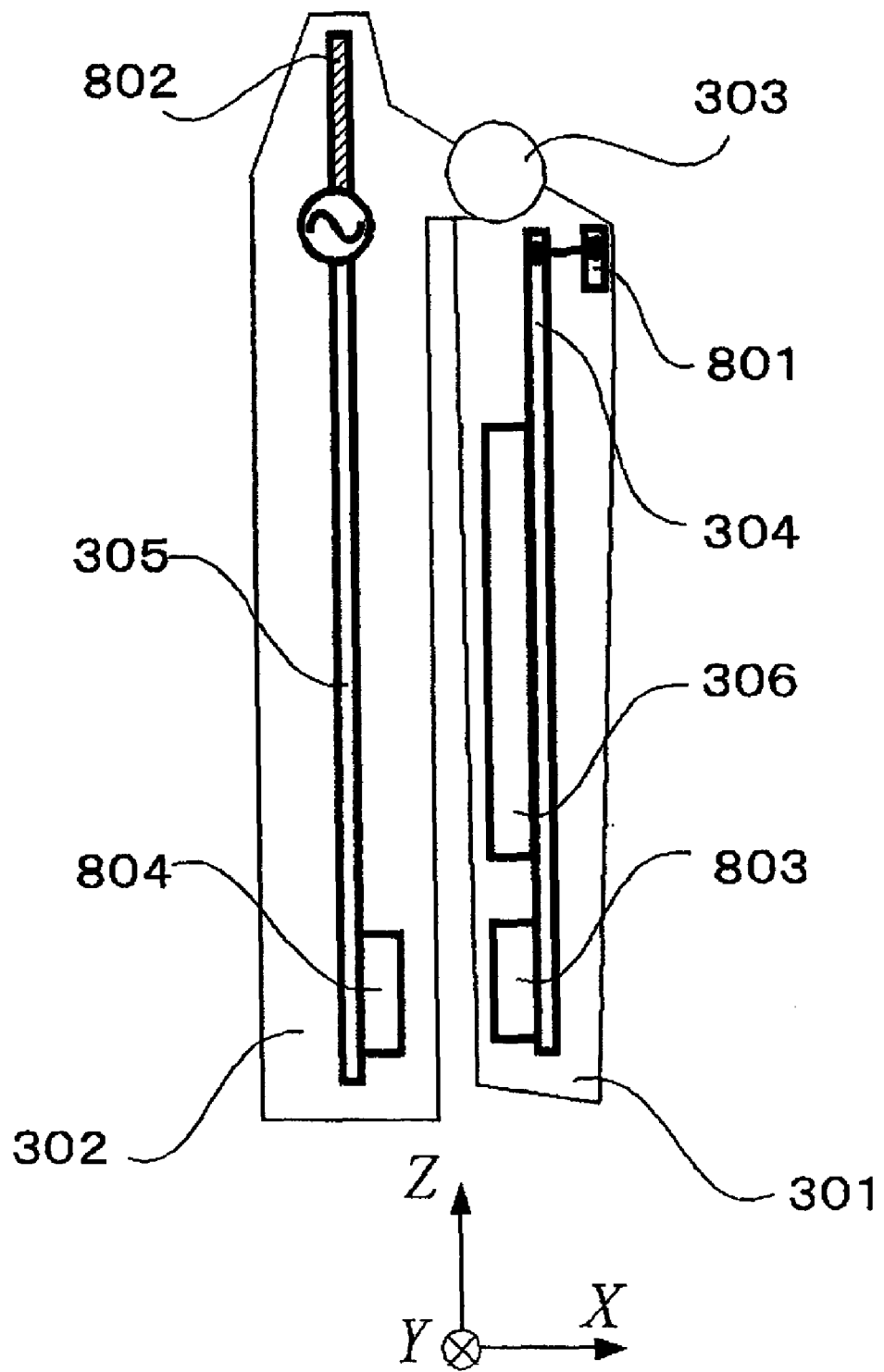
FIG. 9 An explanatory view showing the folding cellular phone according to the third embodiment, which is a side view in its close state.

FIG. 8 and FIG. 9 are views showing a folding cellular phone according to a third embodiment of the present invention. FIG. 8(a) is a back view in its open state, FIG. 8(b) is a side view in its open state, and FIG. 9 is a side view in its close state. In FIG. 8 and FIG. 9, the same reference symbols as those in FIG. 3 indicate the same constituent elements, and their detailed explanation will be omitted herein. Here, explanation will be made under the assumption that an operating frequency of the antenna is in a 2 GHz band.

As shown in FIG. 8 and FIG. 9, in the folding cellular phone according to the present embodiment, a conductor element 801, the upper substrate 304, the liquid crystal display portion 306, and a receiver portion (speaker) 803 are provided to the upper case 301. Also, a feeding element 802, the lower substrate 305, the matching circuit and the radio circuit (both not shown), and a transmitter portion (microphone) 804 are provided to the lower case 302.

The conductor element 801 is arranged on the upper substrate 304 on the opposite side to the receiver portion 803 near the hinge portion 303 of the upper case 301, and the conductor element 801 and the upper substrate 304 are set to have an interval of 3 mm, for example, in the thickness direction. A main portion of the conductor element 801 is in parallel with the width direction (Y-axis direction) of the case, i.e., in parallel with a rotation shaft of the hinge. The conductor element 801 has a length of almost ¼ wavelength (almost 37.5 mm in a free space) in a 2 GHz band. One end of the conductor element 801 is connected electrically to the ground pattern of the upper substrate 304 near the hinge portion 303, and the other end is an open end. A width of the case is normally almost 50 mm, and the main portion of the conductor element 801 corresponds substantially to the width direction of the case. A width of the conductor element 801 is about 2 mm to 5 mm, for example.

The feeding element 802 is arranged near the hinge portion 303 of the lower case 302 such that this element is extended from the hinge portion 303 in the longitudinal direction (Z-axis direction) of the case when the case is closed. The feeding element 802 is connected to the radio circuit via the matching circuit. The feeding element 802 becomes in parallel with the longitudinal direction (Z-axis direction) of the case around the feeding portion. A top end portion of the feeding element 802 as a main portion is in parallel with the width direction (Y-axis direction) of the case, i.e., in parallel with a rotation shaft of the hinge. The feeding element 802 has an L shape as a whole and has a length of almost ¼ wavelength (almost 37.5 mm in a free space) in a 2 GHz band. A width of the feeding element 802 is about 2 mm to 5 mm, for example.

As shown in FIG. 9, when the case is closed, the conductor element 801 is separated away from the feeding element 802 and is not coupled magnetically with the feeding element 802. As a result, the feeding element 802 acts as a ¼-wavelength monopole antenna, and thus a wide band and a high antenna efficiency can be ensured.

In contrast, as shown in FIG. 8, when the case is opened, the conductor element 801 and the feeding element 802 oppose closely to each other at an interval of 5 mm or less, for example, in positions adjacent to the hinge portion 303, and can be coupled magnetically at a time when a power is fed.

Next, an operation in its open state will be explained in more detail with reference to a schematic perspective view in FIG. 10 hereunder.

Figure 10:
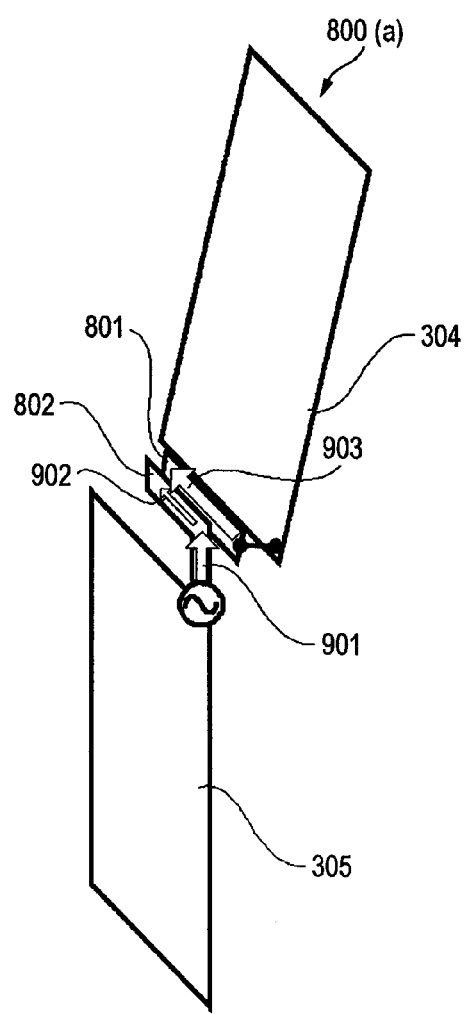
Figure 10:
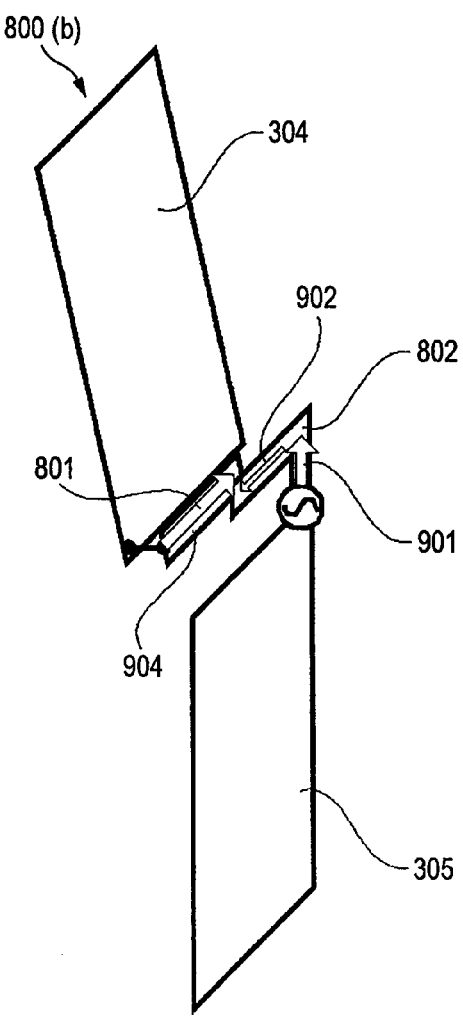

In FIG. 10, an arrow indicates an antenna current in the main portion. FIG. 10(a) shows a folding cellular phone 800(a) when a connection point between the conductor element 801 and the ground pattern of the upper substrate 304 is positioned near the feeding portion of the feeding element 802, and FIG. 10(b) shows a folding cellular phone 800(b) when an open end of the conductor element 801 is positioned near the feeding portion of the feeding element 802. When a length of the conductor element 801 is set to a ¼ wavelength in a 2 GHz band, a magnetic coupling with the feeding element 802 can be tightened and thus an antenna current is concentrated into the conductor element 801 and the upper substrate 304.

At this time, the ground pattern on the conductor element 801 and the upper substrate 304 acts as the upper antenna element, and the ground pattern on the lower substrate 305 act as the lower antenna element. That is, these patterns operate as a dipole antenna, the characteristics equivalent to the antenna structure excites directly the upper case can be achieved.

Figure 11:
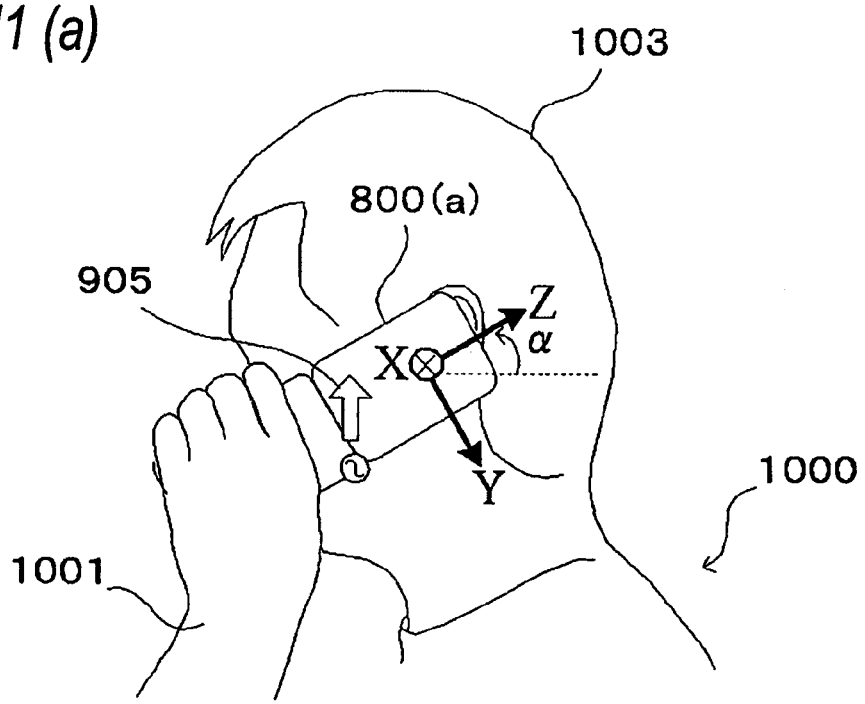
FIG. 11 An explanatory view showing a speaking state of the folding cellular phone according to the third embodiment, wherein FIG. 11(*a*) is an explanatory view of a speaking state in which a user holds a lower case of the folding cellular phone by the left hand while putting a receiver portion to user's left ear, and FIG. 11(*b*) is an explanatory view of a speaking state in which the user holds the lower case of the folding cellular phone by the right hand while putting the receiver portion to user's right ear.
Figure 11:
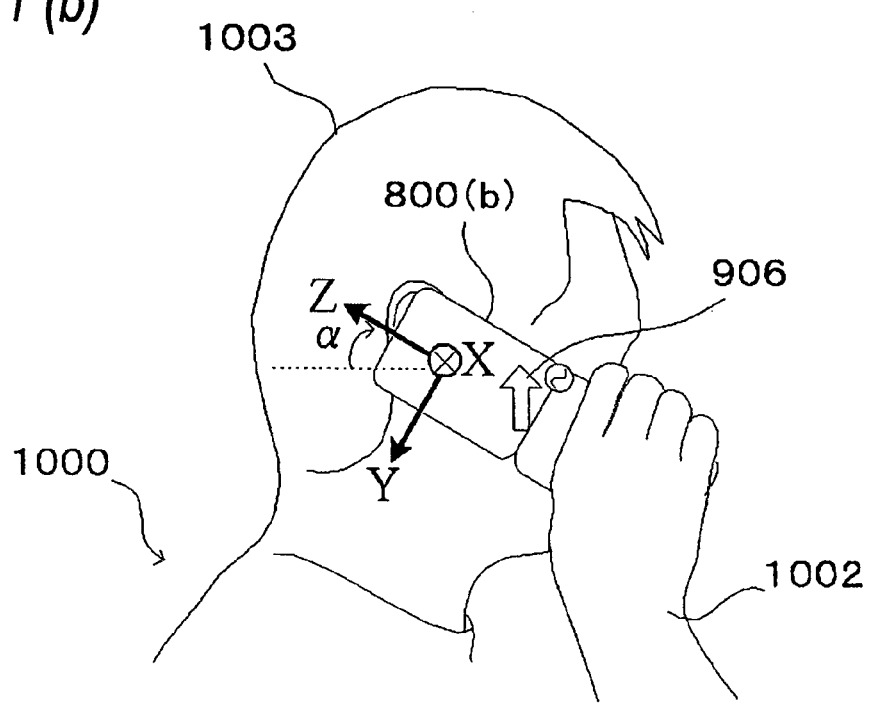

Also, in FIG. 10(a) and FIG. 10(b), a direction of the antenna current flowing through the conductor element 801 is inverted as indicated by an antenna current 903 and an antenna current 904. FIG. 11 shows the speaking state of the folding cellular phone, and normally an angle α of the case in the longitudinal direction (Z-axis direction) to the ground is almost 30°. In the radiation characteristic in FIG. 10(a), an antenna current 901 in the longitudinal direction (Z-axis direction) of the case and an antenna current 903 in the width direction (Y-axis direction) of the case are dominant. As shown in FIG. 11(a), a vertically polarized component is increased by a synthesized antenna current 905 in a speaking state in which the user holds the lower case 302 of the folding cellular phone 800(a) by user's left hand 1001 while putting the receiver portion 803 to user's left ear. In contrast, in the radiation characteristic in FIG. 10(b), the antenna current 901 in the longitudinal direction (Z-axis direction) of the case and an antenna current 904 in the width direction (−Y-axis direction) of the case are dominant. As shown in FIG. 11(b), the vertically polarized component is increased by a synthesized antenna current 906 in a speaking state in which the user holds the lower case 302 of the folding cellular phone 800(b) by user's right hand 1002 while putting the receiver portion 803 to user's right ear. It is known that a normal cross polarization power ratio in a multifrequency environment of the land mobile communication is 4 to 9 dB and a vertically polarized power of an arriving wave is higher than a power of a horizontally polarized power by 4 to 9 dB. This signifies that main polarizations of the antennas of the folding cellular phones 800(a) and 800(b) in the speaking state are perpendicular to the earth and thus a high speaking quality can be ensured.

In addition, an antenna current is concentrated into the back surface of the case, i.e., a portion away from a human body 1000, especially the conductor element 801 of the upper case 301, in the speaking state. Therefore, deterioration of the antenna performance caused by the influence of a head portion 1003 and the hands 1001 and 1002 can be suppressed.

In this case, the antenna current 903 of the conductor element 801 and an antenna current 902 of the feeding element 802 are in phase in the state shown in FIG. 10(a). For this reason, a higher antenna gain can be obtained by the current in the width direction of the case in the configuration in FIG. 10(a) rather than FIG. 10(b), i.e., if a connection point between the conductor element 801 and the ground pattern of the upper substrate 304 is set in vicinity of the feeding portion of the feeding element 802.

As described above, deterioration of the antenna performance caused by the influence of the head portion and the hand can be suppressed and a high antenna gain can be achieved only when the user executes the normal operation to open simply the case and put the receiver portion to the ear.

Figure 12:
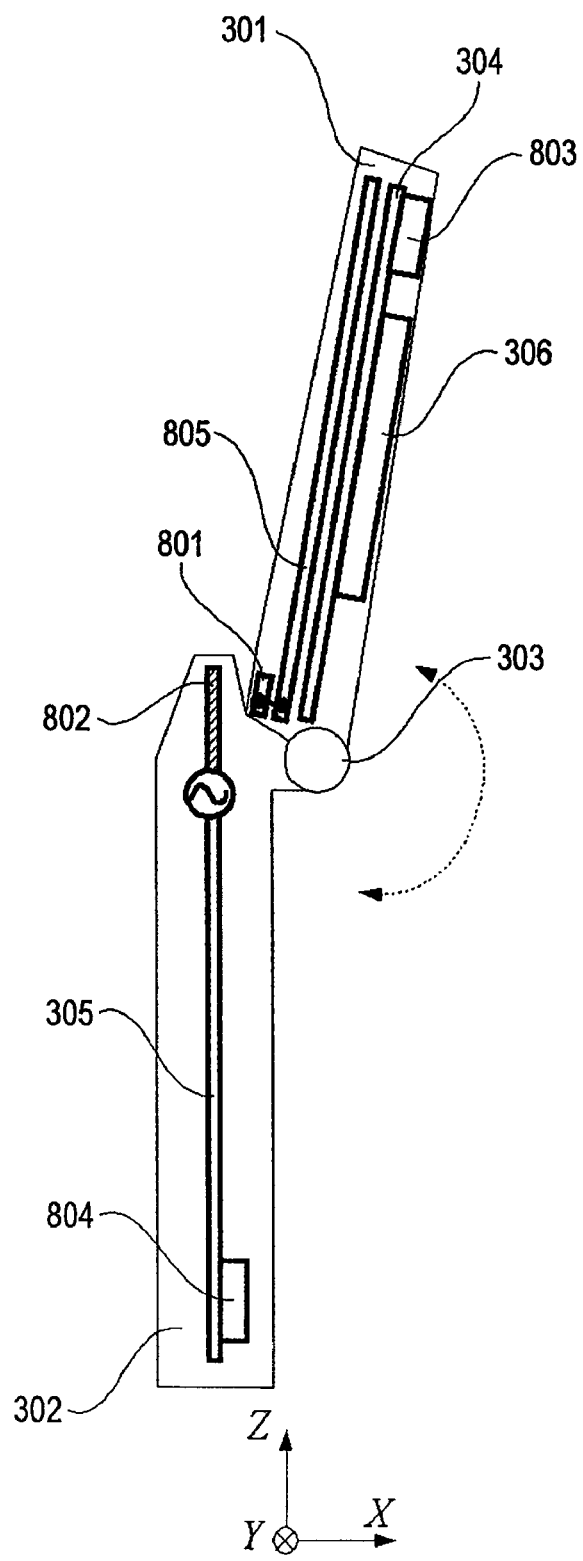
FIG. 12 An explanatory view showing another folding cellular phone according to the third embodiment.

In the above embodiment, the case where the conductor element 801 is connected to the ground pattern on the upper substrate 304 is explained. For example, as shown in FIG. 12, a conductor plate 805 having a size that is equal to or more than the upper substrate 304 may be provided separately to the upper substrate 304 on the opposite side to the receiver portion, then one end of the conductor element 801 may be connected to the conductor plate 805, and then the conductor plate 805 and the conductor element 801 may be pasted onto the resin case of the upper case 301. Otherwise, when the case of the upper case 301 is formed of the conductive material such as magnesium alloy, or the like, the conductor element 801 and the conductor plate 805 may be formed by a solid molding.

Also, the conductor element 801 and the upper substrate 304 or the conductor plate 805 can be constructed on the same plane. From viewpoints of enhancing the magnetic coupling due to the close arrangement of the conductor element 801 and the feeding element 802 and suppressing deterioration of the antenna performance due to the influence of the head portion 1003, it is desirable that the conductor element 801 and the upper substrate 304 or the conductor plate 805 should be arranged at a predetermined interval in the thickness direction.

Figure 13:
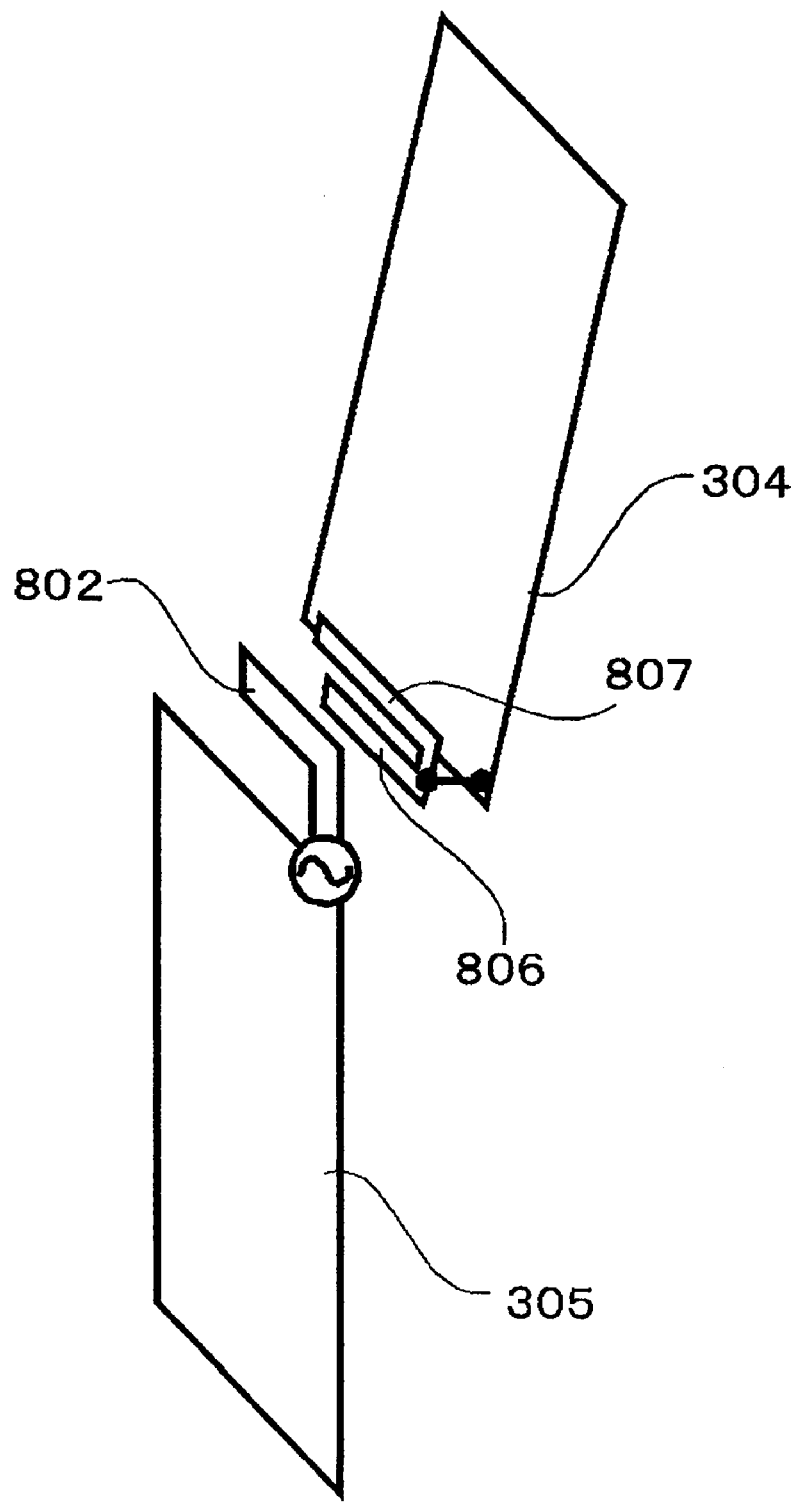
FIG. 13 An explanatory view showing still another folding cellular phone according to the third embodiment.

Also, the case where the conductor element 801 deals with a 2 GHz band is described in the present embodiment. For example, as shown in FIG. 13, conductor elements 806 and 807 (conductor element piece or conductor element) having a different length respectively may be provided to a contact point to the ground pattern of the upper substrate 304, and these conductor elements 806 and 807 may be set to a ¼ wavelength at 2 GHz and 1.8 GHz respectively to deal with a plurality of frequency bands.

Figure 14:
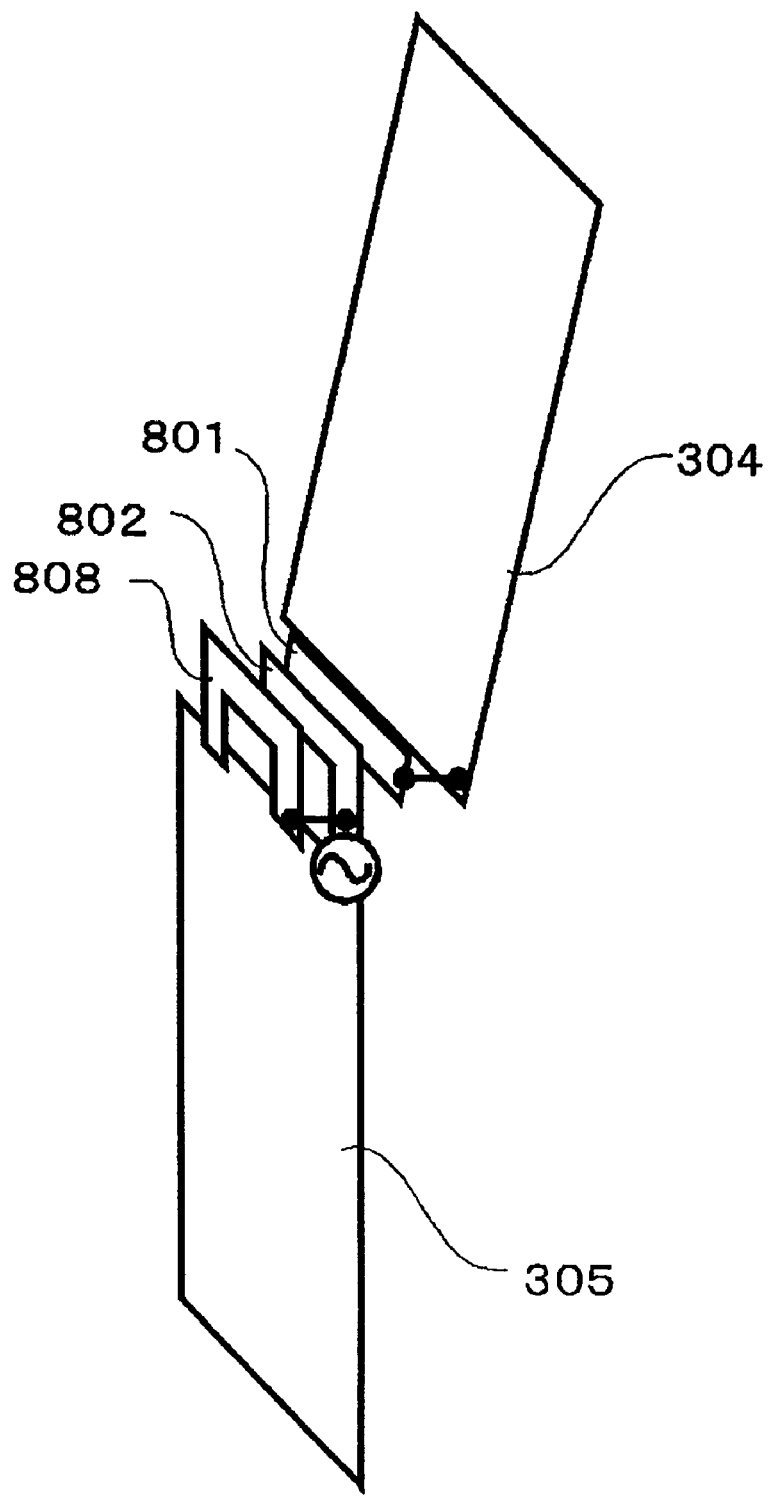
FIG. 14 An explanatory view showing yet still another folding cellular phone according to the third embodiment.

Also, the case where the feeding element 802 deals with a 2 GHz band is described in the present embodiment. For example, as shown in FIG. 14, a feeding element 808 having a different length may be provided separately to the feeding portion of the feeding element 802, and this feeding element 808 may be set to a ¼ wavelength at 900 MHz to deal with a plurality of frequency bands. In this case, the feeding element 802 that corresponds to a frequency band in which the high antenna performance is needed, e.g., a 2 GHz band, should be opposed closely to the conductor element 801.

Fourth Embodiment

Figure 15:
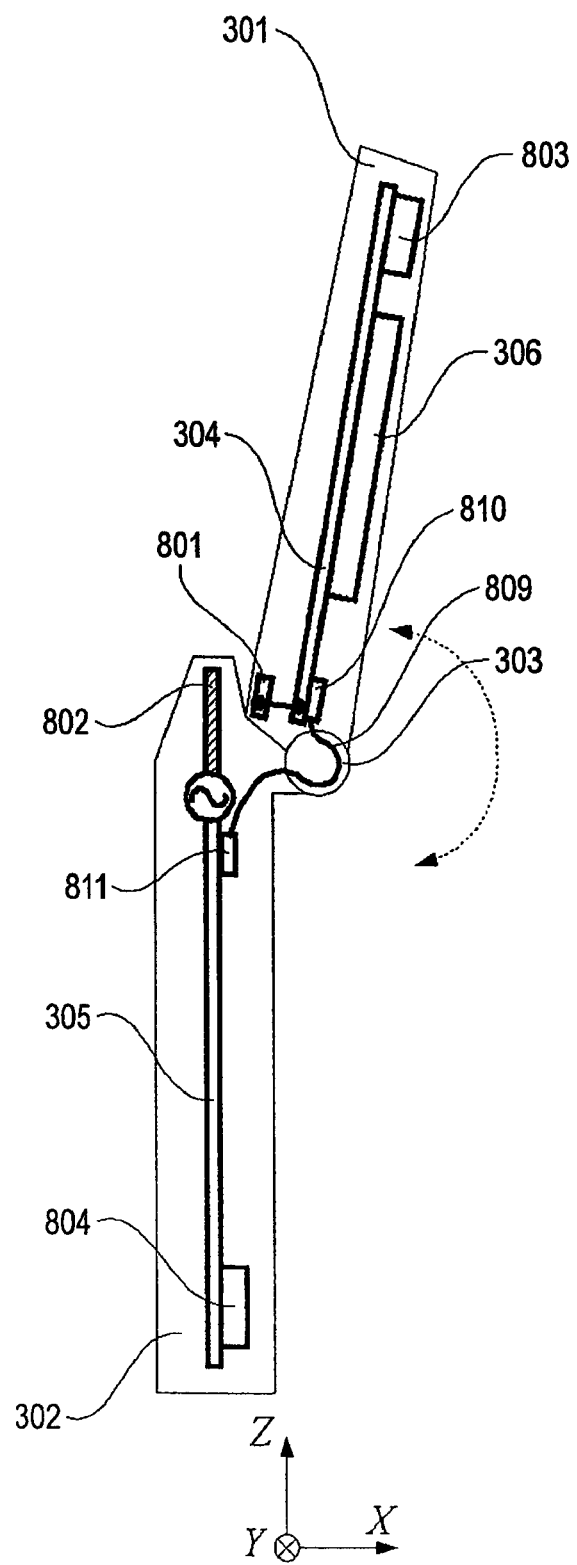
FIG. 15 An explanatory view showing a folding cellular phone according to a fourth embodiment of the present invention.
Figure 16:
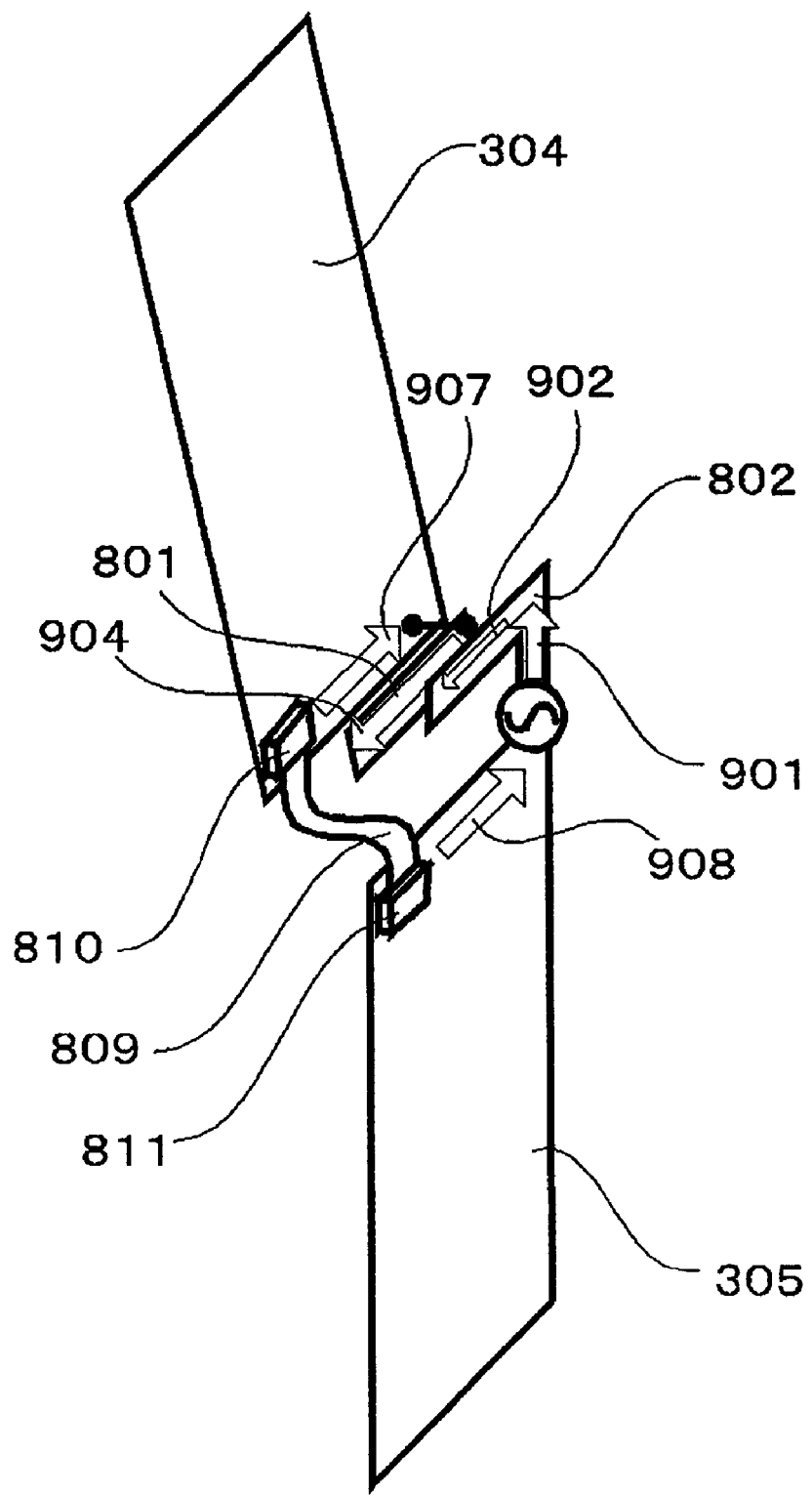
FIG. 16 An explanatory view of an antenna operation of the folding cellular phone according to the fourth embodiment.

FIG. 15 and FIG. 16 are views showing a folding cellular phone according to a fourth embodiment of the present invention. FIG. 15 is a side view in its open state, and FIG. 16 is a perspective view in its open state. In FIG. 15 and FIG. 16, the same reference symbols as those in FIG. 8 to FIG. 14 indicate the same constituent elements, and their detailed explanation will be omitted herein. Here, explanation will be made under the assumption that an operating frequency of the antenna is in a 2 GHz band.

As shown in FIG. 15 and FIG. 16, in the folding cellular phone according to the present embodiment, a flexible cable 809, a coupling connector 810, and a coupling connector 811 are provided.

The flexible cable 809 is a wiring bundle consisting of a plurality of conductor wires that connect electrically circuit parts as typified in the liquid crystal display portion 306 and the receiver portion 803, which are arranged in the upper case 301 and mounted on the upper substrate 304, and a controlling circuit (not shown) that is arranged in the lower case 302 and mounted on the lower substrate 305. One end of the flexible cable 809 is connected to the upper substrate 304 by the coupling connector 810, and the other end is connected to the lower substrate 305. Normally a width of the upper substrate 304 and the lower substrate 305 is set to about 40 mm respectively. The flexible cable 809, the coupling connector 810, and the coupling connector 811 are arranged in positions that are separated from the feeding portion of the feeding element 820 by 30 mm, for example, in the width direction of the folding cellular phone. Also, the coupling connector 810 is separated from a connection position between the conductor element 801 and the upper substrate 304 by 30 mm, for example. Also, a length of the flexible cable 809 is set to 20 mm, for example. In this case, normally the flexible cable 809 has a flexibility to fit to a turning mechanism because this cable must be passed through the hinge portion 303. When the case is opened, a slack of the flexible cable needed to ensure an enough length in the close state is generated in the hinge portion 303, and thus the flexible cable 809 comes close to the head portion of the human body in the speaking state shown in FIG. 11

Next, an operation will be explained with reference to a perspective view in FIG. 16 hereunder.

In FIG. 16, an arrow indicates an antenna current of the main portion. A total length of a route connecting the open end of the conductor element 801, the connection position of the conductor element 801 and the upper substrate 304, the flexible cable 809, the feeding portion of the feeding element 802, and the open end of the feeding element 802 becomes almost 1 wavelength in a 2 GHz band. The antenna current is zero at the open end of the conductor element 801 and the open end of the feeding element 802, the antenna current reaches a top, i.e., an amplitude of the current has a maximal value, at the connection position of the conductor element 801 and the upper substrate 304 and the feeding portion of the feeding element 802, and the antenna current reaches a bottom, i.e., an amplitude of the current has a minimal value, in the flexible cable 809.

Commonly it is known that an antenna current distribution and a local means SAR (Specific Absorption Rates) have a correspondence, a maximum point of the antenna current concentrates upon one location, and the local means SAR is enhanced when the maximum point is located near the human body.

When the conductor element 801 is not provided, the antenna current concentrates upon the flexible cable 809 located closely to the head portion of the human body in the speaking state to have the maximum value, and the local means SAR is enhanced. In contrast, when the conductor element 801 is loaded, the antenna current in the flexible cable 809 is dispersed into the conductor element 801 and the lower end (one side near the hinge portion 303) of the upper substrate 304. Therefore, the antenna current in the flexible cable 809 can be reduced substantially by half and also the local means SAR can be reduced substantially by half.

As described above, deterioration of the antenna performance caused by the influence of the head portion and the hand can be suppressed, a high antenna gain can be achieved, and the local means SAR can be reduced only when the user executes the normal operation to open simply the case and put the receiver portion to the ear.

In this case, a size of the folding cellular phone in the width direction, a separating distance between the flexible cable 809 and the feeding portion of the feeding element 802, and a length of the flexible cable 809 are not restricted to respective numerical values in this embodiment. For example, when this separating distance between the flexible cable 809 and the feeding portion of the feeding element 802 is in excess of 20 mm, the effect can be achieved to some extent. In addition, when a length of the conductor element 801 is set appropriately in answer to a size of the folding cellular phone in the width direction, a separating distance between the flexible cable 809 and the feeding portion of the feeding element 802, and a length of the flexible cable 809, a desired effect can be achieved.

Fifth Embodiment

Figure 17:
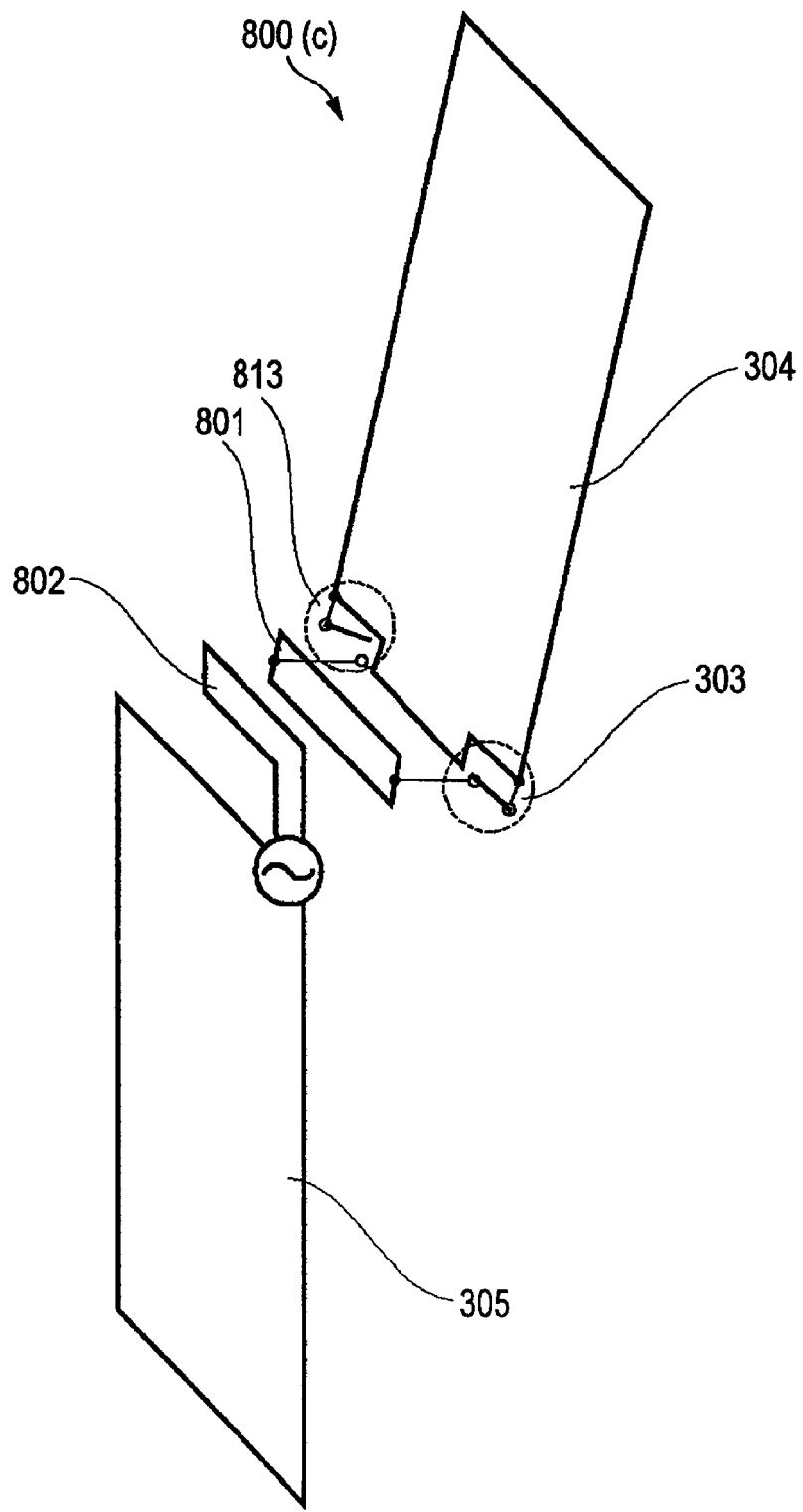
FIG. 17 An explanatory view showing a folding cellular phone according to a fifth embodiment of the present invention.

FIG. 17 is a schematic perspective view showing a folding cellular phone according to a fifth embodiment of the present invention. In FIG. 17, the same reference symbols as those in FIG. 8 to FIG. 16 indicate the same constituent elements, and their detailed explanation will be omitted herein.

As shown in FIG. 17, in a folding cellular phone 800(c) of the present embodiment, a high frequency switch 812 constituting a first switching portion between one end of the conductor element 801 and the ground pattern of the upper substrate 304 of the upper case 301, and a high frequency switch 813 constituting a second switching portion between the other end of the conductor element 801 and the ground pattern of the upper substrate 304 of the upper case 301 are provided.

The high frequency switch 812 and the high frequency switch 813 have two positions of ON and OFF. When the high frequency switch 812 is ON and the high frequency switch 813 is OFF, the folding cellular phone takes a state in FIG. 10(a) explained in the third embodiment. Thus, the high antenna performance can be obtained in the speaking state in which the user holds the phone by the left hand while putting the receiver portion to the left ear. In contrast, when the high frequency switch 812 is OFF and the high frequency switch 813 is ON, the folding cellular phone takes a state in FIG. 10(b) explained in the third embodiment. Thus, the high antenna performance can be obtained in the speaking state in which the user holds the phone by the right hand while putting the receiver portion to the right ear.

Figure 18:
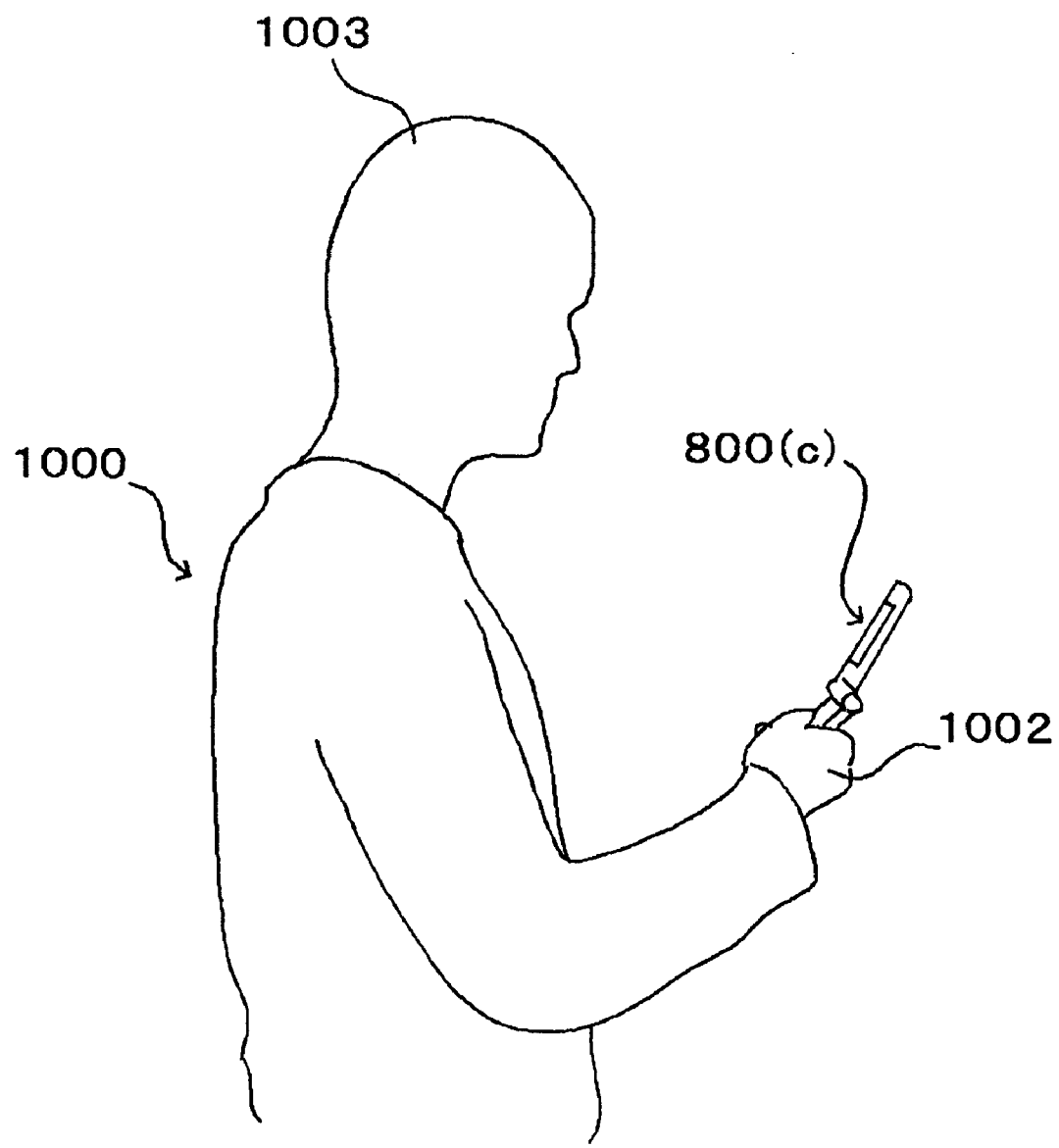
FIG. 18 An explanatory view showing a held state of the folding cellular phone according to the fifth embodiment.

Meanwhile, FIG. 18 is a view showing a state in which the user holds the lower case 302 of the folding cellular phone 800(c) by the right hand in such a way that he or she can view the liquid crystal display portion 306 or the operation portion (not shown). This state corresponds to the state in data communication, in TV phone conversation, or in operation. When the high frequency switch 812 and the high frequency switch 813 are simultaneously turned ON or simultaneously turned OFF, the antenna current of the conductor element 801 is decreased but the antenna current in the longitudinal direction of the case is increased. Therefore, the vertically polarized component is increased in the held state shown in FIG. 18, and thus the high antenna performance can be obtained.

As described above, when the high frequency switch 812 and the high frequency switch 813 are controlled in response to the speaking state or the held state, the high antenna performance can be obtained.

Here, as the method of controlling the high frequency switch 812 and the high frequency switch 813, for example, a received electric field strength may be sensed by the radio circuit (not shown) and then these switches may be controlled to increase a received electric field strength. Otherwise, an acceleration sensor (not shown) may be provided to sense an inclination of the case and then these switches may be controlled by deciding left and right speaking states based on the result. Also, these switches may be controlled by a communication control device (not shown) to respond to the held state depending on a speaking mode or a data communication mode.

Here, the present invention is not limited to the above embodiments at all, and can be embodied in various modes within a scope that does not depart from a gist of the invention.

This application is based upon Japanese Patent Application (Patent Application No. 2004-204343) filed on Jul. 12, 2004, and Japanese Patent Application (Patent Application No. 2004-324136) filed on Nov. 8, 2004; the entire contents of which are incorporated herein by reference.

INDUSTRIAL APPLICABILITY

According to the present invention, a folding mobile radio device that is able to get the high antenna performance by a single antenna irrespective of open/close states not to project the antenna and is suitable for a miniaturization can be provided. Also, a size reduction of the case and a reduction of a production cost can be attained with a simple circuit configuration not to need a plurality of antenna. The present invention is useful to the folding mobile radio device such as the cellular phone, PHS, or the like, the case of which is foldable.

The invention claimed is:

1. A folding mobile radio device, comprising:
   a first case;
   a second case;
   a jointing portion that connects the first case and the second case to open/close the first case and the second case;
   a conductor element that is arranged in an end portion of the first case which is adjacent to the jointing portion; and
   a feeding element that is arranged in an end portion of the second case which is adjacent to the jointing portion,
   wherein in an open state via the jointing portion, the conductor element and the feeding element are arranged so as to oppose to each other and are coupled capacitively at a time of feeding a power, and
   wherein, in a close state via the jointing portion, the conductor element and the feeding element are apart from each other through the jointing portion, so as to change the strength of the capacitive coupling between the conductor element and the feeding element.

2. The folding mobile radio device according to claim 1, wherein the feeding element has an electrical length of almost ¼ wavelength.

3. The folding mobile radio device according to claim 1, wherein the conductor element is connected to a conductor plate arranged in the first case.

4. The folding mobile radio device according to claim 1, wherein the conductor element is connected to a conductor cover fitted to the first case; and
   wherein the conductor cover is connected to the conductor plate arranged in the first case via at least one contact.

5. The folding mobile radio device according to claim 1, wherein the conductor element and the feeding element have flat plane portions respectively, and respective flat plane portions oppose closely to each other in the open state via the jointing portion.

6. The folding mobile radio device according to claim 1, wherein main portions of the conductor element and the feeding element are in parallel with a rotation axis of the jointing portion.

7. The folding mobile radio device according to claim 1, wherein the conductor element has an electrical length of almost ¼ wavelength.

8. The folding mobile radio device according to claim 1, wherein one end of the conductor element is connected to the conductor plate arranged in the first case or connected to the conductor cover fitted to the first case, and other end of the conductor element is an open end.

9. The folding mobile radio device according to claim 8, wherein a connection position of one end of the conductor element and the conductor plate arranged in the first case or the conductor cover fitted to the first case is located near the feeding portion of the feeding element.

10. The folding mobile radio device according to claim 1, wherein at least one of the conductor element and the feeding element is constructed by a plurality of elements having a different electrical length respectively.

11. The folding mobile radio device according to claim 1, further comprising:

a first switching portion that switches a connection such that either one end of the conductor element is connected to the conductor plate arranged in the first case or the conductor cover fitted to the first case or is opened; and a second switching portion that switches a connection such that either other end of the conductor element is connected to the conductor plate arranged in the first case or the conductor cover fitted to the first case or is opened.

* * * * *